(12) United States Patent
Tokumaru

(10) Patent No.: US 7,691,167 B2
(45) Date of Patent: Apr. 6, 2010

(54) CERAMIC HONEYCOMB FILTER, ITS PRODUCTION METHOD, AND PLUGGING MATERIAL FOR CERAMIC HONEYCOMB FILTER

(75) Inventor: Shinya Tokumaru, Fukuoka-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 766 days.

(21) Appl. No.: 10/573,200

(22) PCT Filed: Sep. 29, 2004

(86) PCT No.: PCT/JP2004/014273

§ 371 (c)(1),
(2), (4) Date: Mar. 24, 2006

(87) PCT Pub. No.: WO2005/030364

PCT Pub. Date: Apr. 7, 2005

(65) Prior Publication Data

US 2007/0039298 A1 Feb. 22, 2007

(30) Foreign Application Priority Data

Sep. 29, 2003 (JP) .......................... 2003-338126

(51) Int. Cl.
*B01D 46/00* (2006.01)
*F01N 3/022* (2006.01)

(52) U.S. Cl. .................. 55/523; 55/282.3; 55/385.3; 55/DIG. 5; 55/DIG. 10; 55/DIG. 30; 95/273; 95/278; 60/297; 60/311; 428/116; 264/628; 264/630; 264/631; 264/DIG. 48

(58) Field of Classification Search .............. 55/282.2, 55/282.3, 385.3, 523, 524, DIG. 5, DIG. 10, 55/DIG. 30; 95/273, 278; 60/297, 311; 428/116, 428/117, 118; 264/628, 630, 631, DIG. 48
See application file for complete search history.

(56) References Cited

U.S. PATENT DOCUMENTS

| 5,629,067 | A | * | 5/1997 | Kotani et al. ............... 428/116 |
| 6,827,754 | B2 | | 12/2004 | Suwabe et al. |
| 7,008,461 | B2 | * | 3/2006 | Kuki et al. ................. 55/282.3 |
| 2003/0026944 | A1 | | 2/2003 | Kumazawa et al. |
| 2003/0093982 | A1 | | 5/2003 | Suwabe et al. |

(Continued)

FOREIGN PATENT DOCUMENTS

| CN | 1417455 A | 5/2003 |
| DE | 247209 A1 | 12/2006 |
| EP | 0554104 A1 | 8/1993 |
| EP | 1 293 241 A2 | 3/2003 |
| JP | 57-007215 | 1/1982 |

(Continued)

*Primary Examiner*—Jason M Greene
(74) *Attorney, Agent, or Firm*—Sughrue Mion, PLLC

(57) ABSTRACT

A ceramic honeycomb filter comprising a sintered ceramic honeycomb body having porous partition walls defining flow paths, and plugs formed in predetermined flow paths for removing particulate matter from an exhaust gas passing through the porous partition walls, the sintered ceramic honeycomb body being formed by a cordierite-based ceramic material, at least part of the plugs comprising ceramic particles and an amorphous oxide matrix formed from colloidal oxide.

8 Claims, 2 Drawing Sheets

U.S. PATENT DOCUMENTS

| | | | |
|---|---|---|---|
| 2004/0231307 A1* | 11/2004 | Wood et al. | 55/523 |
| 2005/0210848 A1* | 9/2005 | Kuki et al. | 55/523 |
| 2006/0272306 A1* | 12/2006 | Kirk et al. | 55/523 |
| 2007/0140928 A1* | 6/2007 | Beall et al. | 422/177 |

FOREIGN PATENT DOCUMENTS

| | | |
|---|---|---|
| JP | 63-24731 B * | 5/1988 |
| JP | 63-28875 | 6/1988 |
| JP | 2002-136817 A | 5/2002 |
| JP | 2003-126629 A | 5/2003 |
| JP | 2003-172129 A | 6/2003 |
| JP | 2003-201823 A | 7/2003 |
| JP | 2004-130176 A | 4/2004 |

* cited by examiner

CERAMIC HONEYCOMB FILTER, ITS PRODUCTION METHOD, AND PLUGGING MATERIAL FOR CERAMIC HONEYCOMB FILTER

FIELD OF THE INVENTION

The present invention relates to a ceramic honeycomb filter for removing particulate matter from an exhaust gas discharged from diesel engines, its production method, and a plugging material for producing such ceramic honeycomb filter.

BACKGROUND OF THE INVENTION

To remove particulate matter from an exhaust gas from diesel engines, a particulate-matter-capturing ceramic honeycomb filter comprising a sintered ceramic honeycomb body with porous partition walls, through which the exhaust gas containing particulate matter passes, namely, a diesel particulate filter (DPF) has been developed and put into practical use. The ceramic honeycomb filter comprises a sintered ceramic honeycomb body having porous partition walls defining flow paths and a peripheral wall, and plugs alternately sealing both ends of the flow paths. Because the ceramic honeycomb filter is exposed to high temperatures, the sintered ceramic honeycomb body is made of heat-resistant cordierite ceramics having small thermal expansion coefficients, and plugging materials are the same cordierite ceramics as those of the honeycomb bodies such that there are small differences in thermal expansion between the plugs and the sintered ceramic honeycomb bodies.

When the exhaust gas containing particulate matter flows into such ceramic honeycomb filter, particulate matter in the exhaust gas are captured by fine pores in the porous partition walls. When the captured particulate matter is excessively accumulated in the ceramic honeycomb filter, there is likely to arise increased pressure loss in the filter, resulting in decrease in the engine power. Accordingly, the ceramic honeycomb filter is periodically regenerated by burning the captured particulate matter by an external ignition means such as an electric heater, a burner, etc. A pair of ceramic honeycomb filters are usually mounted onto an automobile, utilizing an alternate regeneration method, in which while one filter is regenerated, the other filter is used.

With respect to characteristics, the ceramic honeycomb filter is required not only to suffer low pressure loss to avoid the decrease of engine performance, but also to have enough thermal shock resistance to withstand thermal shock due to rapid temperature changes at regeneration, the stop of an engine, etc. Accordingly, various improvements have been proposed on plugs for the ceramic honeycomb filters.

JP63-28875B discloses a method for plugging open ends of a sintered ceramic honeycomb body, comprising plugging a sintered honeycomb structure by a cordierite-forming material batch, and then sintering it at a temperature of 1300° C. or higher to convert the cordierite-forming material batch to cordierite. This method provides a cordierite honeycomb filter having excellent thermal shock resistance and reliability, in which the predetermined open ends of the flow paths of the sintered ceramic honeycomb body are completely sealed.

JP2002-136817A discloses a ceramic honeycomb filter comprising sealing the predetermined open ends of flow paths of a sintered or unsintered ceramic honeycomb body with a plugging material comprising sintered powder and unsintered powder having the same composition as that of the sintered ceramic honeycomb body, and heating it at as high temperatures as 1400° C. to form plugs. Because the plugging material contains pulverized powder having the same composition as that of the sintered ceramic honeycomb body in this ceramic honeycomb filter, no cracking due to a thermal expansion difference occurs in the plugs or portions of the honeycomb structure near the plugs even at high temperatures, and there are no troubles such as the peeling of the plugs, etc.

It has been found, however, that when the plugging material is heated to a cordierite-forming temperature (for instance, 1300° C.) or higher to bond it to the sintered ceramic honeycomb body as in the above conventional technologies, it is difficult to make the thermal expansion coefficient of the cordierite ceramic honeycomb structure equal to that of the plugs. Namely, because plate-like kaolin particles in a cordierite material for the sintered ceramic honeycomb body are oriented when passing through a narrow slit of an extrusion die in the extrusion-molding of the material, cordierite crystals formed by sintering are also oriented, so that the resultant honeycomb structure has a small thermal expansion coefficient in a flow path direction and a radial direction. However, because the plugging material does not pass through the narrow slit of the extrusion die, cordierite crystals are randomly oriented, resulting in a relatively large thermal expansion coefficient. Accordingly, there is a large difference in a thermal expansion coefficient between the honeycomb structure and the plugs.

In addition, large residual stress is generated in interfaces between the plugs and the sintered ceramic honeycomb body at a bonding temperature of 1300° C. or higher. Large residual stress is likely to cause cracking in the plugs or in interfaces between the plugs and the honeycomb structure, and the peeling of the plugs, due to thermal shock by an exhaust gas and mechanical shock by engine vibration and vibration by contact with roads when mounted to automobiles.

JP63-24731B discloses a method for sealing predetermined flow paths of a porous ceramic honeycomb structure by forming openings in a film attached to the ends of the porous ceramic honeycomb structure at predetermined points, and charging a plugging material into the flow paths through the openings. In Example 3 of this reference, a slurry containing alumina cement and pulverized mullite is introduced into predetermined flow paths of a ceramic honeycomb structure under vibration, and the resultant plugs are cured at a temperature of 55° C. and a humidity of 90% for 2 hours, to integrate the plugs to the honeycomb structure. In this method, because the plug-bonding temperature is as low as 55° C., there is small residual stress in interfaces between the plugs and the ceramic honeycomb structure.

It has been found, however, that because the cordierite honeycomb structure has a small thermal expansion coefficient while the plugs composed of mullite and alumina cement have a relatively large thermal expansion coefficient, it is likely that cracking occurs between the ceramic honeycomb structure and the plugs by thermal shock by an exhaust gas, and that the plugs peel off, when mounted to an automobile.

OBJECTS OF THE INVENTION

Accordingly, an object of the present invention is to provide a ceramic honeycomb filter with small difference in a thermal expansion coefficient between the partition walls of a sintered ceramic honeycomb body and plugs, and with small residual stress because of a low plug-bonding temperature, thereby having excellent thermal shock resistance.

Another object of the present invention is to provide a method for producing such a ceramic honeycomb filter.

A further object of the present invention is to provide a plugging material for producing such a ceramic honeycomb filter.

DISCLOSURE OF THE INVENTION

The inventors have found that by forming a sintered ceramic honeycomb body by a material comprising cordierite as a main component, and by forming plugs by a plugging material containing ceramic particles and colloidal oxide, the colloidal oxide is converted to an amorphous oxide matrix even by low-temperature heating, thereby providing a ceramic honeycomb filter with small difference in a thermal expansion coefficient between the sintered ceramic honeycomb body and the plugs, and with small residual stress because of the low-temperature bonding of the plugs. The present invention has been completed based on this finding.

Thus, the ceramic honeycomb filter of the present invention comprises a sintered ceramic honeycomb body having porous partition walls defining flow paths, and plugs formed in predetermined flow paths to remove particulate matter from an exhaust gas passing through the porous partition walls, the sintered ceramic honeycomb body being made of a cordierite-based ceramic material; and at least part of the plugs comprising ceramic particles and an amorphous oxide matrix formed from colloidal oxide.

The ceramic particles are preferably cordierite particles and/or amorphous silica particles. The ceramic particles are preferably pulverized powder of the same material as the sintered ceramic honeycomb body. The colloidal oxide is preferably colloidal silica and/or colloidal alumina.

The method of the present invention for producing the above ceramic honeycomb filter comprises the steps of forming the sintered ceramic honeycomb body by a cordierite-based ceramic material, and heating a plugging material filled in predetermined flow paths of the sintered ceramic honeycomb body to a temperature of 1000° C. or lower to form plugs bonded to the sintered ceramic honeycomb body.

The bonding temperature of the plugging material is preferably 500° C. or lower, more preferably 150° C. or lower.

At least part of the plugs are preferably formed by a plugging material containing ceramic particles and colloidal oxide.

The plugging material for the ceramic honeycomb filter of the present invention comprises ceramic particles and colloidal oxide.

BRIEF DESCRIPTION OF THE DRAWINGS

FIG. 3(*b*) is a schematic cross-sectional view showing the method of forming plugs in predetermined flow paths of the ceramic honeycomb filter.

DESCRIPTION OF THE PREFERRED EMBODIMENTS

Figure 1:
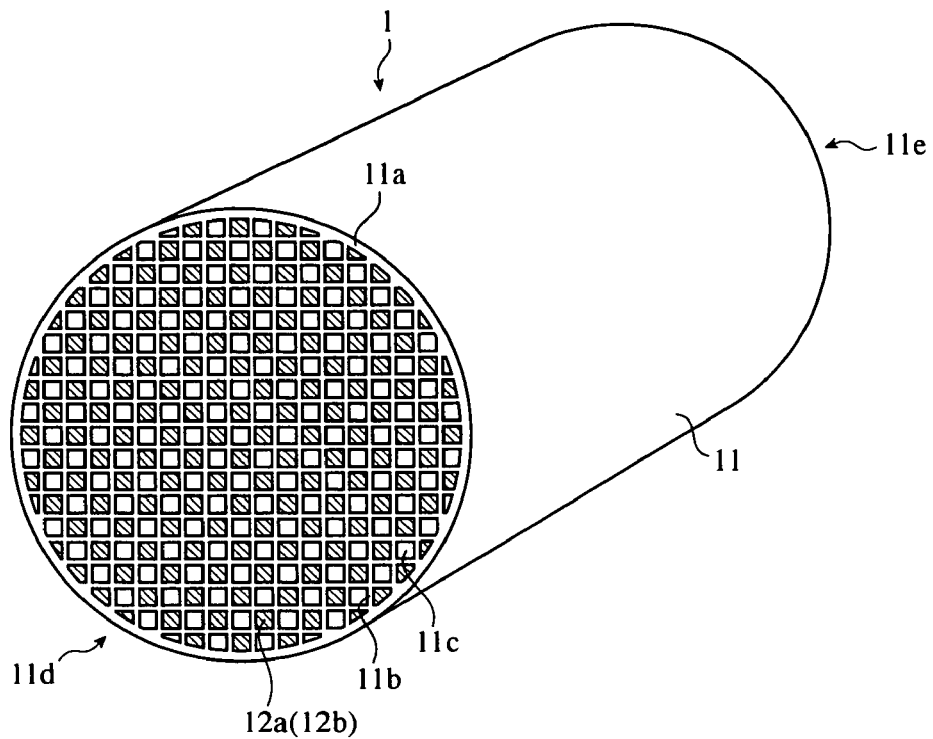
FIG. 1 is a perspective view showing the appearance of the ceramic honeycomb filter of the present invention.

The ceramic honeycomb filter of the present invention comprises a sintered ceramic honeycomb body made of a cordierite-based ceramic material, and plugs formed in predetermined flow paths of the sintered ceramic honeycomb body, at least part of the plugs being formed by a plugging material comprising ceramic particles and colloidal oxide. By filling the plugging material into the predetermined flow paths of the sintered ceramic honeycomb body and then heating it, the colloidal oxide is converted to an amorphous oxide matrix, resulting in strong bonding of the plugs to the sintered ceramic honeycomb body. The plugging material for plugs will be explained first, and the ceramic honeycomb filter and its production method will then be explained.

[1] Plugging Material

Ceramic particles in the plugging material for the ceramic honeycomb filter of the present invention are preferably cordierite particles and/or amorphous silica particles. This is because small thermal expansion coefficients of cordierite particles and amorphous silica particles provide the plugs with a small thermal expansion coefficient, so that there is a small difference in a thermal expansion coefficient between the plugs and the sintered cordierite ceramic honeycomb body. There is only small residual stress in the plugs containing such ceramic particles, which is generated by the bonding to the partition walls of the honeycomb structure. In addition to the cordierite particles and/or the amorphous silica particles, mullite ceramic, etc. may be added. The ceramic particles have the maximum particle size of preferably 200 μm or less, more preferably 100 μm or less, and an average diameter of preferably 5-50 μm, more preferably 5-15 μm.

The ceramic particles constituting the plugs are preferably composed of pulverized powder of the same material as the sintered ceramic honeycomb body, because a small difference in a thermal expansion coefficient between the plugs and the sintered cordierite ceramic honeycomb body prevents cracking from occurring in the plugs or interfaces between the plugs and the honeycomb structure, and the plugs from peeling. In this case, the ceramic particles need not necessarily be composed only of pulverized powder of the same material as the sintered ceramic honeycomb body, but may be cordierite particles, or their mixtures with amorphous silica particles, mullite ceramic particles, etc.

The colloidal oxide forming the amorphous oxide matrix of the plug comprises colloidal silica and/or colloidal alumina as a main component, because (a) the viscosity of the plugging material composed of colloidal silica and/or colloidal alumina can be properly adjusted, thereby making it possible to surely filling the plugging material into flow paths even in their corners, to provide a high bonding strength between the partition walls and the plugs, and because (b) the colloidal silica and/or colloidal alumina are well bonded to the ceramic particles, thereby forming high-strength plugs.

The colloidal oxide is preferably 1-50 parts by mass per 100 parts by mass of the ceramic particles on a solid basis. When the colloidal oxide is less than 1 part by mass on a solid basis, the amorphous oxide matrix formed by the colloidal oxide does not have a sufficient bonding force to the ceramic particles, resulting in the likelihood that the plugs peel off. On the other hand, when the colloidal oxide exceeds 50 parts by mass on a solid basis, the plugs have too large a thermal expansion coefficient, resulting in the likelihood that the ceramic honeycomb filter, to which the plugs are bonded, have a low thermal shock resistance. The amount of the colloidal oxide added is more preferably 2-35 parts by mass, most preferably 5-20 parts by mass, per 100 parts by mass of the ceramic particles on a solid basis.

The plugging material for the ceramic honeycomb filter of the present invention may contain ceramic fibers, cement, etc. if necessary, in addition to the ceramic particles and the colloidal oxide. Also, to adjust the viscosity of the plugging material, thereby improving workability, an organic binder such as methylcellulose, etc., a dispersant, etc. may be added.

[2] Ceramic Honeycomb Filter

Figure 2:
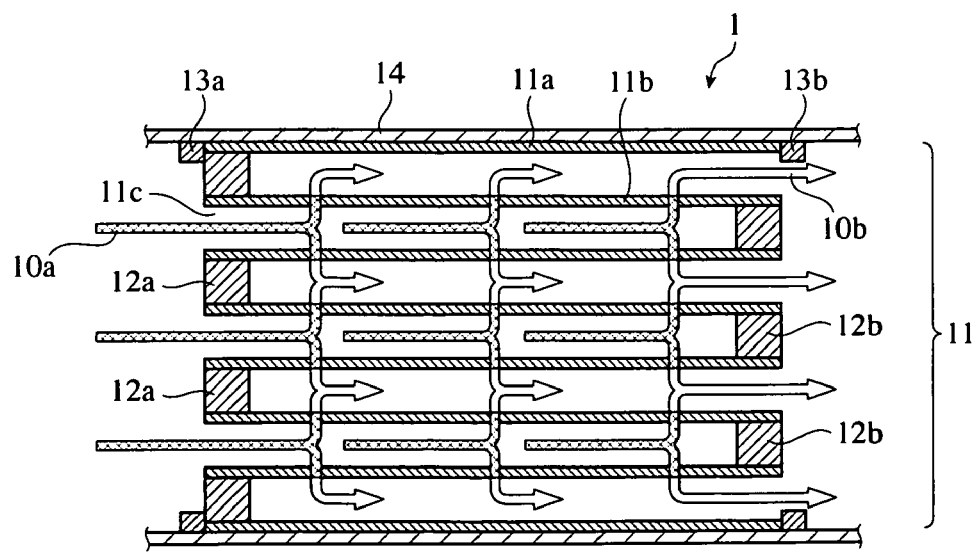
FIG. 2 is a schematic cross-sectional view showing the structure of the ceramic honeycomb filter of the present invention.

FIG. 1 is a perspective view showing one example of the appearance of the ceramic honeycomb filter, to which the present invention is applicable, and FIG. 2 is a cross-sectional view of the ceramic honeycomb filter of FIG. 1 used as an exhaust-gas-cleaning filter. As shown in FIGS. 1 and 2, the ceramic honeycomb filter 1, to which the present invention is applicable, is constituted by a sintered ceramic honeycomb body 11 comprising a peripheral wall 11a and porous partition walls 11b inside the peripheral wall 11a, and plugs 12a, 12b alternately sealing open ends of the flow paths 11c encircled by the porous partition walls 11b. The ceramic honeycomb filter 1 is received in a metal container 14 with the peripheral wall 11a fixed by holding members 13a, 13b.

The percentage of the amorphous oxide matrix in the plugs 12a, 12b is substantially the same as that of the colloidal oxide in the plugging material. Namely, the amorphous oxide matrix is preferably 1-50 parts by mass, more preferably 2-35 parts by mass, most preferably 5-20 parts by mass, per 100 parts by mass of the ceramic particles.

The exhaust gas 10a containing particulate matter flows into the flow paths 11c through inlet-side open ends, pass through the porous partition walls 11b, and are discharged as a cleaned gas 10b from the exit-side open ends via the adjacent flow paths 11c. While passing through the porous partition walls 11b, the particulate matter contained in the exhaust gas 10a is captured in fine pores in the porous partition walls 11b. Thus, the ceramic honeycomb filter 1 acts as an exhaust-gas-cleaning filter.

The ceramic honeycomb filter of the present invention can be used not only for an alternate regeneration method, but also for a continuous regeneration method for continuously burning particulate matter in combination with a precious metal catalyst.

[3] Production Method of Ceramic Honeycomb Filter

The production method of the ceramic honeycomb filter of the present invention is characterized in charging a plugging material containing ceramic particles and colloidal oxide into predetermined flow paths of the sintered ceramic honeycomb body made of a cordierite-based ceramic material, and heating it at a temperature of 1000° C. or lower.

In the present invention, the inclusion of the colloidal oxide makes the bonding temperature of the plugging material as low as 1000° C. or lower, making it unnecessary to conduct sintering at as high a cordierite-forming temperature as 1300° C. or higher as conventional plugging materials. Accordingly, residual stress generated by the bonding of the plugs to the sintered ceramic honeycomb body can be reduced. By suppressing the residual stress, it is possible to avoid such problems as thermal shock by an exhaust gas and mechanical shock by engine vibration and vibration by contact with roads when mounted to automobiles, cracking in the plugs or in interfaces between the plugs and the honeycomb structure, the peeling of the plugs, etc. Also, because the bonding temperature is as low as 1000° C. or lower, a heating energy cost can be reduced.

When the colloidal oxide in the plugging material is dewatered at a temperature of 1000° C. or lower, a strong, solid, amorphous oxide matrix can be formed irreversibly, thereby strongly adhering the ceramic particles, and strongly bonding the plugging material to the partition walls of the sintered ceramic honeycomb body. Because the plugs contain the ceramic particles and the amorphous oxide matrix formed from the colloidal oxide, the plugs have a small thermal expansion coefficient, so that only a small difference in a thermal expansion coefficient exists between the plugs and the sintered cordierite ceramic honeycomb body having a low thermal expansion coefficient. Accordingly, the ceramic honeycomb filter of the present invention has small residual stress.

Why the temperature of bonding the plugs to the partition walls is as low as 1000° C. or lower is that an aqueous colloidal oxide in the plugging material is fully dewatered at 1000° C. or lower to irreversibly provide a strong solid, namely, an amorphous oxide matrix. Accordingly, the ceramic particles are not only strongly adhered to each other but also strongly bonded to the partition walls of the sintered ceramic honeycomb body at a temperature of 1000° C. or lower, so that the plugs are integrally fixed to the partition walls. The temperature for bonding the plugging material to the partition walls need only be a temperature of dewatering the colloidal oxide or higher, and its upper limit may generally be 1000° C., particularly 500° C., further 150° C. Particularly when the plug-bonding temperature is 500° C. or lower, residual stress generated by the difference in a thermal expansion coefficient between the honeycomb structure and the plugs can be made smaller, thereby reducing an energy cost for bonding. The lower limit of the plug-bonding temperature is preferably 50° C.

Using a plugging material for the ceramic honeycomb filter of the present invention, the ceramic honeycomb filter comprising two sintered ceramic honeycomb bodies integrally bonded to each other via plugs in a flow path direction can be obtained by charging the plugging material into open ends of the predetermined flow paths of both sintered ceramic honeycomb bodies, abutting both plugging materials of the sintered ceramic honeycomb bodies, and heating them at a temperature of 1000° C. or lower. In this case, with plugs formed only in the downstream-side open ends of the upstream-side, sintered ceramic honeycomb body, a ceramic honeycomb filter having space upstream of the inlet-side plugs can be obtained. The ceramic honeycomb filter having such structure can effectively capture particulate matter in the exhaust gas in the space upstream of the inlet-side plugs. The filter can be regenerated by burning the captured particulate matter by an external ignition means disposed on the inlet side. In this case, too, because the plugs and the partition walls of both sintered ceramic honeycomb bodies are strongly and integrally bonded to each other, the ceramic honeycomb filter can withstand thermal shock due to rapid temperature variations.

The present invention will be described in detail referring to Examples below without intention of limiting the present invention thereto.

EXAMPLES 1-27, COMPARATIVE EXAMPLES 1-3, CONVENTIONAL EXAMPLE 1

(1) Production of Sintered Ceramic Honeycomb Body

Cordierite-forming materials were blended and extrusion-molded to form a green body having a honeycomb structure. This green body was sintered at a temperature of 1425° C. to obtain a sintered cordierite ceramic honeycomb body having an outer diameter of 266.7 mm and a length of 304.8 mm.

(2) Preparation of Plugging Material Slurry

The ceramic particles and the colloidal oxide shown in Table 1 were mixed at ratios shown in the rows of Examples 1-27 in Table 2, and 1.2 parts by mass of methylcellulose as an organic binder and water were added to 100 parts by mass of the ceramic particles to form a plugging material slurry of Examples 1-27 capable of sealing the sintered ceramic honeycomb body. Used as the ceramic particles were fused silica A in Examples 1-9, fused silica B in Examples 10-12, and cordierite powder (powder obtained by pulverizing a cordierite honeycomb structure having a porosity of 65%) in Examples 13-27. Also used as the colloidal oxide were colloidal silica in Examples 1-25, and colloidal alumina in Examples 26 and 27.

Each plugging material of Comparative Examples 1-3 shown in Table 3 was blended with 1.2 parts by mass of methylcellulose as an organic binder and water, to obtain a plugging material slurry of Comparative Examples 1-3 capable of sealing the sintered ceramic honeycomb body. In Comparative Examples 1 and 2, cordierite powder (powder obtained by pulverizing a cordierite honeycomb structure having a porosity of 65%) shown in Table 1, and unsintered cordierite-forming material powder comprising 15% of talc, 24% of calcined talc, 20% of kaolin, 26.5% of calcined kaolin and 14.5% of alumina on a mass basis were used. In Comparative Example 3, only unsintered cordierite-forming material powder was used.

1 part by mass of methylcellulose, 9.25 parts by mass of glycerin, and 30 parts by mass of water were added to 100 parts by mass of unsintered cordierite-forming material powder, which was the material batch No. 1 described in Example of JP63-28875B (38.2% of calcined talc, 20.0% of kaolin, 21.8% of calcined kaolin, 10.5% of alumina, and 9.5% of aluminum hydroxide, on a mass basis) and blended, to form a plugging material slurry of Conventional Example 1 capable of sealing the sintered ceramic honeycomb body.

(3) Plugging Method

As shown in FIG. 3, a resin mask 21 having openings for plugging predetermined flow paths of the sintered ceramic honeycomb body was provided. To provide the mask 21 with openings, machining, heating, punching, etc. are used.

Figure 3A:
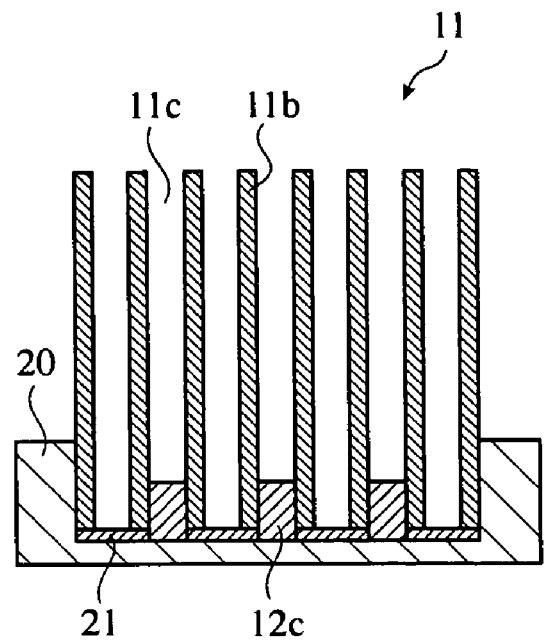
FIG. 3(*a*) is a schematic cross-sectional view showing the method of forming plugs in predetermined flow paths of the ceramic honeycomb filter.
Figure 3B:
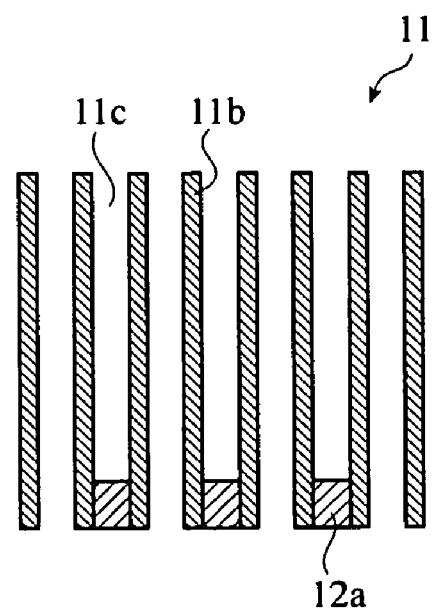

As shown in FIG. 3(a), with predetermined openings of the flow paths 11c on one side sealed by the resin mask 21, the honeycomb structure 11 was immersed in each plugging material slurry 12c in a container 20. Water was absorbed in the partition walls from the slurry that entered into the flow paths through the open ends of the honeycomb structure 11, so that plugs were formed. As shown in FIG. 3(b), the honeycomb structure 11 was lifted out of the plugging material slurry 12c, and the plugs 12a was dried. The same immersion treatment was conducted to the openings of the sintered ceramic honeycomb body 11 on the other side, to obtain a honeycomb structure whose flow paths were alternately sealed.

To bond the plugs to the partition walls 11b of the sintered ceramic honeycomb body 11 strongly, the plugs of each honeycomb structure was heated at a temperature shown in Tables 2 and 3. Taking into consideration influence on thermal shock resistance, any plug of the resultant ceramic honeycomb filter was set to 10 mm.

(4) Evaluation

Each of the resultant ceramic honeycomb filters was evaluated with respect to thermal shock resistance and the strength of the plugs.

(a) Thermal Shock Resistance

Each ceramic honeycomb filter was heated from room temperature to a predetermined temperature in an electric furnace, kept at the predetermined temperature for 2 hours, and taken out of the electric furnace, to observe cracking. The evaluation standards of the thermal shock resistance are as follows:

Excellent: Not cracked at 600° C. or higher.

Good: Not cracked at 550° C. or higher and lower than 600° C.

Fair: Not cracked at 500° C. or higher and lower than 550° C.

Poor: Cracked at lower than 500° C.

When no cracking occurred at 500° C. or higher (from "Excellent" to "Fair"), the ceramic honeycomb filter passed the thermal shock resistance test, and when cracking occurred at lower than 500° C., it failed. The thermal shock resistance evaluation results are shown in Tables 2 and 3.

(b) Strength of Plugs

Each plug was pressed by a spherical tip end (diameter: 1.0 mm) of an indenter to measure its fracture strength. With the plug strength of Conventional Example 1 being 1.0, the strength of each plug is shown by a relative value in Tables 2 and 3.

TABLE 1

| Type | Composition | Average Diameter (μm) | Solid Component (% by mass) |
|---|---|---|---|
| Ceramic Particles | Fused Silica A | 14.1 | — |
|  | Fused Silica B | 30.1 | — |
|  | Cordierite (Porosity: 65%) | 12.0 | — |
| Colloidal Oxide | Colloidal Silica | — | 50 |
|  | Colloidal Alumina | — | 30 |

| Type | Composition | Composition (% by mass) | | | | | | | |
|---|---|---|---|---|---|---|---|---|---|
|  |  | $SiO_2$ | $Al_2O_3$ | MgO | $Na_2O$ | $K_2O$ | CaO | $Fe_2O_3$ | $TiO_2$ |
| Ceramic Particles | Fused Silica A | 99.9 | 0.08 | — | 0.003 | 0.002 | — | 0.001 | — |
|  | Fused Silica B | 99.6 | 0.1 | — | 0.004 | 0.002 | 0.02 | 0.02 | — |
|  | Cordierite (Porosity 65%) | 50.5 | 33.7 | 14.9 | 0.17 | 0.001 | 0.09 | 0.49 | 0.09 |
| Colloidal Oxide | Colloidal Silica | 99.3 | ≦0.1 | ≦0.1 | 0.5 | — | ≦0.1 | — | — |
|  | Colloidal Alumina | ≦0.1 | 99.5 | ≦0.1 | 0.3 | — | ≦0.1 | — | — |

TABLE 2

| No. | Ceramic Particles Type | Parts by Mass | Colloidal Oxide Type | Parts by Mass |
|---|---|---|---|---|
| Example 1 | Fused Silica A | 100 | Colloidal Silica | 12.5 |
| Example 2 | Fused Silica A | 100 | Colloidal Silica | 12.5 |
| Example 3 | Fused Silica A | 100 | Colloidal Silica | 12.5 |
| Example 4 | Fused Silica A | 100 | Colloidal Silica | 40.0 |
| Example 5 | Fused Silica A | 100 | Colloidal Silica | 35.0 |
| Example 6 | Fused Silica A | 100 | Colloidal Silica | 20.0 |
| Example 7 | Fused Silica A | 100 | Colloidal Silica | 5.0 |
| Example 8 | Fused Silica A | 100 | Colloidal Silica | 2.0 |
| Example 9 | Fused Silica A | 100 | Colloidal Silica | 1.0 |
| Example 10 | Fused Silica B | 100 | Colloidal Silica | 12.5 |
| Example 11 | Fused Silica B | 100 | Colloidal Silica | 20.0 |
| Example 12 | Fused Silica B | 100 | Colloidal Silica | 20.0 |
| Example 13 | Cordierite | 100 | Colloidal Silica | 12.5 |
| Example 14 | Cordierite | 100 | Colloidal Silica | 40.0 |
| Example 15 | Cordierite | 100 | Colloidal Silica | 35.0 |
| Example 16 | Cordierite | 100 | Colloidal Silica | 20.0 |
| Example 17 | Cordierite | 100 | Colloidal Silica | 5.0 |
| Example 18 | Cordierite | 100 | Colloidal Silica | 12.5 |
| Example 19 | Cordierite | 100 | Colloidal Silica | 5.0 |
| Example 20 | Cordierite | 100 | Colloidal Silica | 2.0 |
| Example 21 | Cordierite | 100 | Colloidal Silica | 35.0 |
| Example 22 | Cordierite | 100 | Colloidal Silica | 20.0 |
| Example 23 | Cordierite | 100 | Colloidal Silica | 5.0 |
| Example 24 | Cordierite | 100 | Colloidal Silica | 2.0 |
| Example 25 | Cordierite | 100 | Colloidal Silica | 1.0 |
| Example 26 | Cordierite | 100 | Colloidal Alumina | 12.5 |
| Example 27 | Cordierite | 100 | Colloidal Alumina | 12.5 |

| No. | Bonding Temperature of Plugs (° C.) | Thermal Shock Resistance | Relative Strength of Plugs |
|---|---|---|---|
| Example 1 | 1000 | Fair | 1.5 |
| Example 2 | 850 | Fair | 1.5 |
| Example 3 | 500 | Fair | 1.6 |
| Example 4 | 500 | Fair | 2.0 |
| Example 5 | 150 | Fair | 1.9 |
| Example 6 | 150 | Good | 1.9 |
| Example 7 | 150 | Good | 1.9 |
| Example 8 | 500 | Good | 1.7 |
| Example 9 | 500 | Good | 1.5 |
| Example 10 | 850 | Fair | 1.5 |
| Example 11 | 500 | Fair | 1.5 |
| Example 12 | 150 | Fair | 1.9 |
| Example 13 | 1000 | Fair | 1.6 |
| Example 14 | 850 | Fair | 1.9 |
| Example 15 | 850 | Fair | 1.8 |
| Example 16 | 850 | Good | 1.7 |
| Example 17 | 850 | Good | 1.7 |
| Example 18 | 500 | Excellent | 1.9 |
| Example 19 | 500 | Excellent | 1.9 |
| Example 20 | 500 | Good | 1.7 |
| Example 21 | 150 | Good | 1.9 |
| Example 22 | 150 | Excellent | 1.9 |
| Example 23 | 150 | Excellent | 1.9 |
| Example 24 | 150 | Good | 1.7 |
| Example 25 | 150 | Good | 1.5 |
| Example 26 | 850 | Good | 1.5 |
| Example 27 | 150 | Good | 1.4 |

Note:
[1] The amount of the colloidal silica and the colloidal alumina are expressed on a solid basis.

TABLE 3

| No. | Ceramic Particles Type | Parts by Mass | Colloidal Oxide Type | Parts by Mass |
|---|---|---|---|---|
| Comparative Example 1 | Cordierite | 100 | Unsintered Cordierite Powder | 50 |
| Comparative Example 2 | Cordierite | 100 | Unsintered Cordierite Powder | 50 |
| Comparative Example 3 | — | — | Unsintered Cordierite Powder | 100 |
| Conventional Example 1 | — | — | Unsintered Cordierite Powder | 100 |

| No. | Bonding Temperature of Plugs (° C.) | Thermal Shock Resistance | Relative Strength of Plugs |
|---|---|---|---|
| Comparative Example 1 | 1000 | Poor | 0.2 |
| Comparative Example 2 | 1400 | Poor | 0.9 |
| Comparative Example 3 | 1000 | Poor | 0.2 |
| Conventional Example 1 | 1400 | Poor | 1 |

It is clear from Tables 2 and 3 that the ceramic honeycomb filters of Examples 1-27 are much superior to those of Comparative Examples 1-3 and Conventional Example 1 in thermal shock resistance and the strength of plugs. In Comparative Example 2 and Conventional Example 1, in which plugs were bonded at 1400° C., cracking occurred in the ceramic honeycomb filter at lower than 500° C. On the other hand, in Examples 1 and 13, in which the plug-bonding temperature was 1000° C., the ceramic honeycomb filters was evaluated as "passed," because their thermal-shock-resisting temperatures were 500° C. or higher. Also, in Examples 2-12 and 14-27, in which the plug-bonding temperature was 150° C.-850° C., the thermal-shock-resisting temperatures were 500° C. or higher. Particularly in Examples 18, 19, 22 and 23, in which the plug-bonding temperature was 500° C. or lower, powder obtained by pulverizing a honeycomb filter sintered bodies was used as the ceramic particles, and colloidal silica was used as the colloidal oxide in an amount of 5-20 parts by mass on a solid basis, the thermal-shock-resisting temperatures of the ceramic honeycomb filters were as extremely high as 600° C., exhibiting excellent thermal shock resistance.

EFFECT OF THE INVENTION

The sintered ceramic honeycomb filter of the present invention is advantageous in that (a) because the plugs contain ceramic particles, there is a small difference in a thermal expansion coefficient between the plugs and the sintered ceramic honeycomb body, and that (b) because the plugs comprise an amorphous oxide matrix formed by a colloidal oxide, the plugging material is bonded to the sintered ceramic honeycomb body at low temperatures, resulting in a small residual stress. Accordingly, the ceramic honeycomb filter of the present invention has excellent thermal shock resistance with much reduced production cost.

What is claimed is:
1. A ceramic honeycomb filter comprising a sintered ceramic honeycomb body having porous partition walls defining flow paths, and plugs formed in predetermined flow paths for removing particulate matter from an exhaust gas passing through said porous partition walls, said sintered ceramic honeycomb body being made of a cordierite-based ceramic material; and at least part of said plugs comprising ceramic particles and an amorphous oxide matrix formed from colloidal oxide, wherein said ceramic particles are cordierite particles and/or amorphous silica particles.

2. The ceramic honeycomb filter according to claim 1, wherein said ceramic particles are pulverized powder of the same material as the sintered ceramic honeycomb body.

3. The ceramic honeycomb filter according to claim 1, wherein said colloidal oxide is colloidal silica and/or colloidal alumina.

4. A method for producing a ceramic honeycomb filter comprising a sintered ceramic honeycomb body having porous partition walls defining flow paths, and plugs formed in predetermined flow paths for removing particulate matter from an exhaust gas passing through said porous partition walls, comprising the steps of forming said sintered ceramic honeycomb body by a cordierite-based ceramic material, and heating a plugging material filled in predetermined flow paths of said sintered ceramic honeycomb body to a temperature of 1000° C. or lower to form plugs bonded to said sintered ceramic honeycomb body, wherein at least part of said plugs are formed by a plugging material containing ceramic particles and colloidal oxide.

5. The method for producing a ceramic honeycomb filter according to claim 4, wherein the bonding temperature of said plugging material is 500° C. or lower.

6. The method for producing a ceramic honeycomb filter according to claim 4, wherein said ceramic particles are pulverized powder of the same material as the sintered ceramic honeycomb body.

7. The ceramic honeycomb filter according to claim 2, wherein said colloidal oxide is colloidal silica and/or colloidal alumina.

8. The method for producing a ceramic honeycomb filter according to claim 5, wherein said ceramic particles are pulverized powder of the same material as the sintered ceramic honeycomb body.

* * * * *